United States Patent [19]

Hargraves

[11] Patent Number: 4,459,819
[45] Date of Patent: Jul. 17, 1984

[54] PULSE CONTROLLED EXPANSION VALVE AND METHOD

[75] Inventor: David P. Hargraves, St. Louis County, Mo.

[73] Assignee: Emerson Electric Co., St. Louis, Mo.

[21] Appl. No.: 438,405

[22] Filed: Nov. 1, 1982

Related U.S. Application Data

[63] Continuation-in-part of Ser. No. 354,136, Mar. 5, 1982.

[51] Int. Cl.³ ............... F25B 41/04; F25B 41/06; F16K 31/02
[52] U.S. Cl. ............................. 62/212; 62/225; 62/511; 251/141
[58] Field of Search .......... 62/222, 225, 223, 224, 62/205, 212, 210, 211, 511; 251/129, 141

[56] References Cited

U.S. PATENT DOCUMENTS

| 2,828,936 | 4/1958 | Hales | 251/141 X |
| 3,537,272 | 11/1970 | Hales et al. | 62/223 X |
| 3,659,631 | 5/1972 | Rakoske | 251/141 X |
| 3,677,028 | 7/1972 | Raymond | 62/222 X |
| 3,778,025 | 12/1973 | Lane et al. | 251/129 |
| 4,067,203 | 1/1978 | Behr | 62/208 |
| 4,112,703 | 9/1978 | Kountz | 62/211 |

FOREIGN PATENT DOCUMENTS 0001352   1/1978   Japan .................... 62/511

Primary Examiner—Albert J. Makay
Assistant Examiner—Harry Tanner
Attorney, Agent, or Firm—Polster, Polster and Lucchesi

[57] ABSTRACT

A pulse controlled refrigeration expansion valve and method of controlling the valve is disclosed. The valve is preferably an on/off (open/closed) direct controlled solenoid valve. The valve is periodically energized (opened) and de-energized (closed) in response to a refrigeration system parameter (e.g., superheat) such that the ratio of energization time/de-energization time during each period of operation of the valve is varied in response to the system parameter(s) and such that the on/off solenoid valve functions as a modulated refrigerant flow control expansion valve.

17 Claims, 9 Drawing Figures

PULSE CONTROLLED EXPANSION VALVE AND METHOD

CROSS REFERENCE TO RELATED APPLICATION

This is a continuation-in-part application of my U.S. patent application Ser. No. 354,136, filed Mar. 5, 1982.

BACKGROUND OF THE INVENTION

This invention relates to apparatus for and a method of controlling a refrigeration system. More specifically, this invention is concerned with an expansion valve, such as a solenoid operated valve, and a system responsive to a parameter of the refrigeration system for controlling operation of the solenoid valve thereby to regulate the flow of refrigerant through the expansion valve. Even more specifically, this invention relates to a solenoid valve which is periodically energized and de-energized during each period of operation of the valve and a control system responsive to a refrigeration system parameter (e.g., superheat) which varies the ratio of the energization time to the de-energization time of the solenoid valve during each period of operation of the valve so as to regulate the flow of refrigerant through the valve.

Typically, a refrigeration system includes a compressor, a condenser coil, and an evaporator coil. Refrigerant vapor is compressed to high pressure by the compressor and is directed into the condenser where the high pressure refrigerant vapor is condensed to a high pressure liquid. An expansion valve is provided between the condenser and the evaporator so that liquid refrigerant from the condenser may be adiabatically expanded before it enters the evaporator. In the evaporator, the low pressure refrigerant absorbs heat from the surroundings and is at least in part transformed into a vapor which is returned via a suction line to the inlet of the compressor. In many conventional refrigeration systems, the expansion valve is a so-called thermostatic expansion valve. Typically, a thermostatic expansion valves has an expansion port therein and a valve member for regulating the flow of refrigerant through the expansion port. A spring biases the valve member toward its closed position. A diaphragm actuator is provided. One side of the diaphragm is exposed to suction gas pressure while the other side is connected via a capillary tube to a thermostatic bulb in heat transfer relation with the refrigerant vapor (referred to as the suction gas) exhausted from the evaporator. The bulb is charged with a suitable volatile fluid (e.g., a refrigerant) and thus exerts a pressure force on the valve member via the diaphragm actuator counteracting the force of the spring and the suction gas pressure. Upon the thermostatic bulb's sensing an increase in temperature of the suction gas with respect to its' pressure, the net pressure force exerted on the diaphragm actuator is correspondingly increased thereby to further open the valve and to permit more refrigerant to flow through the evaporator thus resulting in a lowering of the suction gas temperature. Upon sensing a decrease in suction gas temperature, the thermostatic bulb will decrease the pressure force exerted on the diaphragm actuator and thus will permit the spring to at least partially close the valve thus lowering the flow of refrigerant into the evaporator and, in turn, raising the temperature of the suction gas.

Generally, a thermostatic expansion valve is adjusted or set to maintain the suction gas at a predetermined superheat level or setting. Superheat is a term of art which is generally defined as the temperature of the refrigerant vapor above the evaporated temperature of the refrigerant at the specified pressure of the refrigerant. In many refrigeration systems, the thermostatic expansion valve is preset at the factory so as to maintain a predetermined superheat level and it is impossible or impractical to vary the superheat setting of typical thermostatic expansion valves during operation of the refrigeration system so as to control the flow of refrigerant through the evaporator in response to changes in the operating conditions of the refrigeration system thereby to maximize the operating efficiency of the refrigeration system.

In an effort to overcome the shortcomings of prior thermostatic expansion valves in which the superheat setting could not be varied during operation of the refrigeration system in response to changing operating conditions (e.g., changes in the refrigeration heat load or in the outside ambient air temperature), so-called electrically operated, modulating expansion valves were developed. Such electrically operated modulating expansion valves are disclosed in the coassigned U.S. Pat. No. 3,967,781. In this electrically operated expansion valve, a plurality of bi-metallic elements and heating elements are interleafed so that upon energization of the heating elements, the bi-metallic elements expand in axial direction thereby to open the valve. Upon de-energization of the heaters, the bi-metallic metals cool and contract in axial direction thus effecting closing of the valve. This electrical heater/bi-metal actuator is oftentimes referred to as a heat motor. By controlling the heat generated by the heaters in the heat motor, this electrically operated expansion valve could be regulated in response to system parameters (e.g., superheat) so as to regulate the flow of refrigerant through the valve.

While these prior electrically operated expansion valves worked well for their intended purpose, they had certain drawbacks in that they did require the above-mentioned heat motor actuator which was expensive. Thus, there has been a longstanding need for a low-cost, electrically operated expansion valve which is operable to regulate refrigerant flow in proportion to the requirements of the refrigeration system.

SUMMARY OF THE INVENTION

Among the many objects and features of the present invention may be noted the provision of apparatus for and a method of controlling a refrigeration system expansion valve in response to a parameter of the refrigeration system;

The provision of such apparatus and method which utilizes a low-cost, directly operated solenoid valve which is repeatedly or periodicaly energized and de-energized in response to the refrigeration system parameter being monitored in such manner that the on/off cycles of the valve are integrated to result in a steady state, but variable regulation of the flow of refrigerant through the refrigeration system;

The provision of such apparatus and method which utilizes an open/closed, non-modulating electrically operated expansion valve functioning as a modulating proportional refrigerant flow control valve;

The provision of a solenoid valve for use in a refrigeration system proportioned flow control system, as above described, which is of low cost, which has a long service life, and which is reliable in operation;

The provision of a method of controlling the flow of refrigerant through an evaporator utilizing both a proportional control and an integrator control system such that the control of the control system is stable even at small differences between the monitored parameter and a predetermined parameter;

The provision of such a solenoid valve in which a wide range of manufacturing tolerances and wear tolerances will not substantially adversely affect the flow of refrigerant through the valve; and The provision of such a solenoid valve and a control system therefore which may be used in conjunction with refrigeration systems having a wide range of capacities.

Briefly stated, apparatus of this invention controls a refrigeration system. The refrigeration system includes a compressor having an inlet and an outlet, a condenser connected to the outlet of the compressor, an evaporator connected to the condenser, and to the inlet of the compressor. An expansion valve is provided between the condenser and the evaporator with the condenser delivering high pressure liquid refrigerant to the evaporator. The refrigerant expands as it flows through the expansion valve and the refrigerant is substantially converted to a vapor in the evaporator as it absorbs heat from the surroundings. The control apparatus of the present invention comprises a solenoid valve constituting the above-noted expansion valve, this solenoid valve having a valve body with a flow passage therein for the flow of refrigerant therethrough. A valve seat is provided in the valve body constituting a portion of the flow passage and a valve member is selectively movable between a closed position in which it is sealingly engageable with the valve seat so as to block the flow of refrigerant through the flow passage and an open position in which the valve member is clear of the valve seat permitting flow of the refrigerant through the valve passage. A solenoid actuator is provided for effecting movement of the valve member from its closed to its open position under energization of the solenoid actuator. The valve further includes a spring for resiliently biasing the valve member from its open to its closed position. Further, the control apparatus of the present invention includes control means for periodically or repeatedly energizing and de-energizing the solenoid actuator with the ratio of energization (open) time to de-energization (closed) time of each period being responsive to one or more operating parameters of the refrigeration system thereby to regulate the flow of refrigerant through the refrigeration system.

The method of this invention for controlling an expansion valve for a refrigeration system utilizes apparatus generally as set forth above. The method comprises the steps of monitoring a parameter of a refrigeration system and generating a signal in response to this parameter. Then, this signal is utilized to effect repeated periodic energization and de-energization of the solenoid valve with the ratio of energization time to de-energization time of the solenoid valve during each period being responsive to the signal so as to regulate the flow of refrigerant through the refrigeration system.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
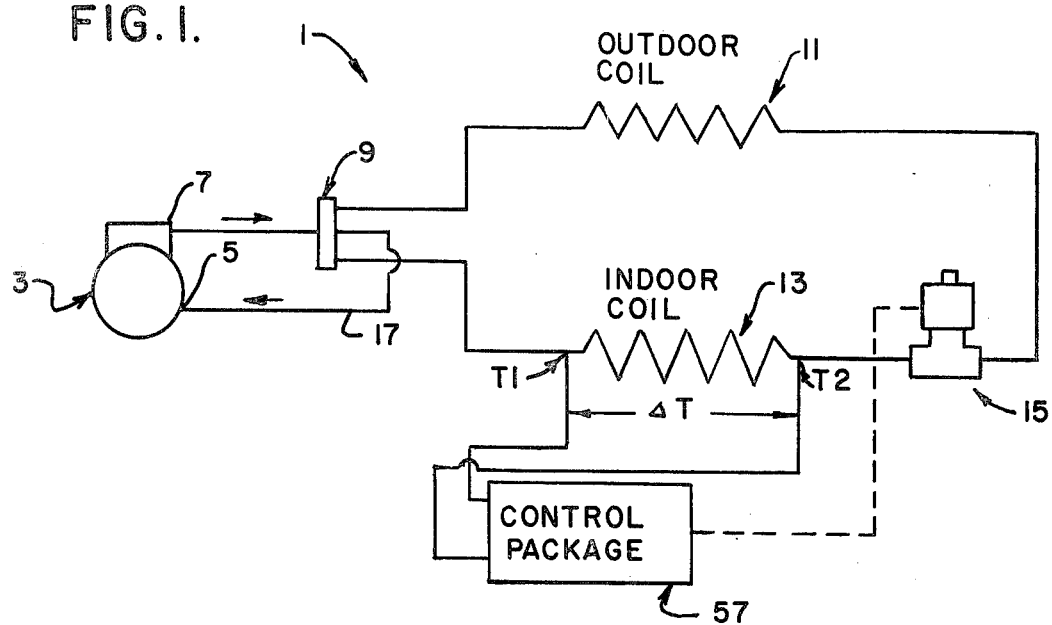
FIG. 1 is a diagrammatic view of a refrigeration system, more specifically a heat pump refrigeration system, utilizing an on/off solenoid valve of the present invention controlled in accordance with the apparatus and method of the present invention.

Referring now to the drawings, and in particular to FIG. 1, a refrigeration system is indicated in its entirety in schematic form by reference character 1. This refrigeration system is shown to be a heat pump system and it includes a hermetic compressor 3 having an inlet 5 and an outlet 7. The outlet 7 of the compressor is connected to a conventional 4-way reversing valve 9. One outlet of reversing valve 9 is connected to a coil 11 located out-of-doors of the building in which heat pump system 1 is located. The outlet of the outlet coil is connected to the inlet of another coil 13 located indoors and an expansion valve 15 for regulating the flow of refrigerant from the outdoor coil to the indoor coil or vice versa is provided between the coils 11 and 13. The outlet of the indoor coil is connected to the other side of reversing valve 9 and the center suction port of the reversing valve is connected to compressor inlet 5 by means of a suction line 17. In operation, by reversing the position of reversing valve 9, the heat pump system may be operated either in a cooling or a heating mode. In the cooling mode, the heat pump operates as an air conditioner system in which the outdoor coil 11 functions as a condenser and the indoor coil 13 functions as an evaporator. In the heating mode, the flow of refrigerant is reversed through the coils such that the indoor coil functions as a condenser and the outdoor coil functions as an evaporator. Throughout the remainder of this specification, for the purpose of understanding and simplicity, it will be assumed that the heat pump system 1 is operated in its cooling mode such that outdoor coil 11 functions as a condenser and indoor coil 13 functions as an evaporator.

Figure 2:
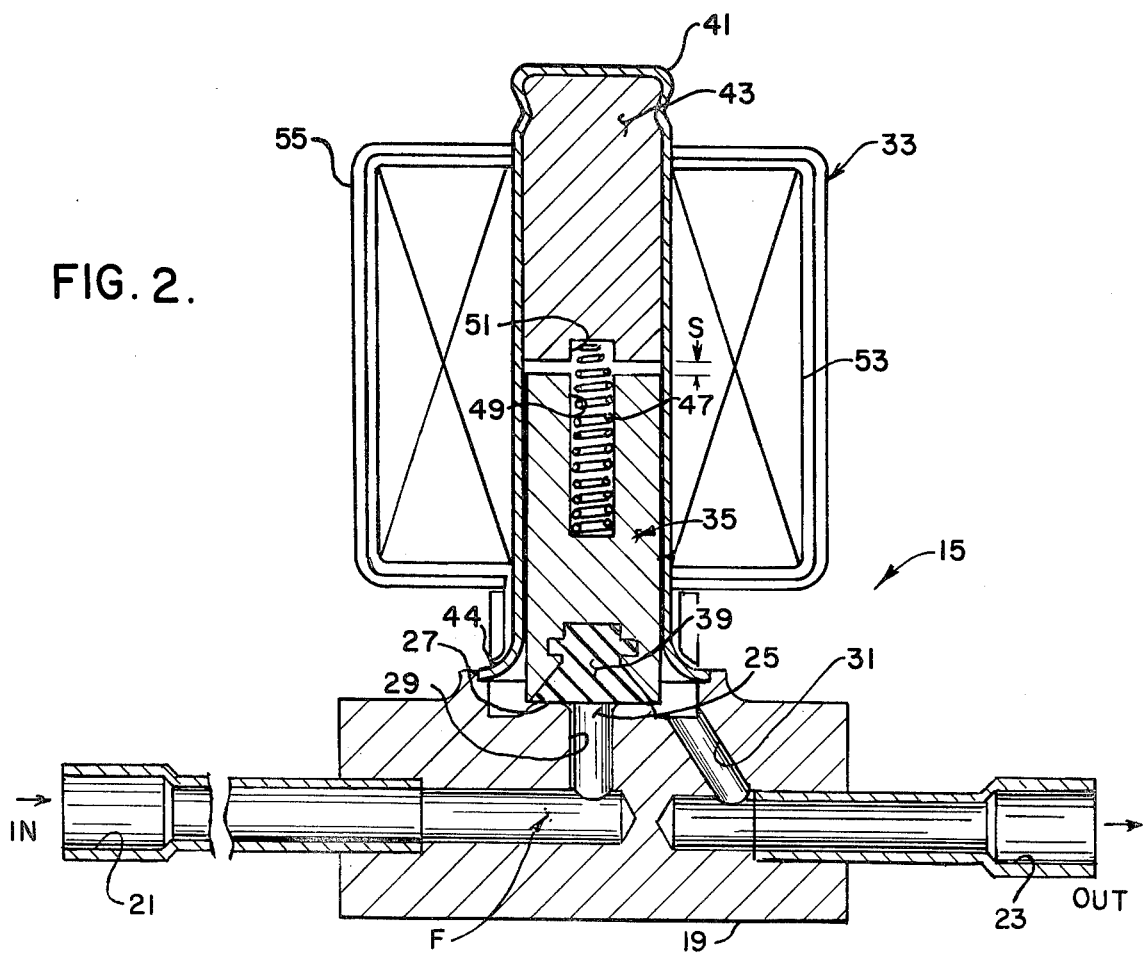
FIG. 2 is an enlarged cross-sectional view of a solenoid control valve of the present invention.

Referring now to FIG. 2, a detailed description of expansion valve 15 will be provided. Preferably, expansion 15 is a low-cost, direct operated solenoid actuated valve. It will be understood that when the solenoid valve 15 is energized, it is fully opened and when it is de-energized, all flow of refrigerant through the valve is blocked. Valve 15 includes a valve body 19 having a flow passage F extending therethrough with the flow passage having an inlet 21 and an outlet 23. As is conventional, flared tubing ends are sealably secured (soldered) to valve body 19 so as to constitute the inlets and outlets 21 and 23, respectively. These flared tubing ends permit the valve to be readily incorporated in the refrigerant lines of refrigeration system 1, such as by soldering the tubing ends in place. An expansion valve port 25 is provided in flow path F intermediate the inlet and outlet ends of the flow path and this expansion port 25 is constituted by an annular shoulder or valve seat 27 facing generally upwardly (as viewed in FIG. 2). A perpendicular passage 29 is concentric within valve seat 27 and permits refrigerant to flow upwardly to the valve seat from flow passage F. An oblique passage 31 is provided downstream from expansion port 25 and permits the passage of refrigerant from the expansion port to outlet 23.

As generally indicated at 33, a solenoid actuator is provided for valve 15. This solenoid actuator includes a valve member, as generally indicated at 35, axially shiftable between a closed position (as shown in FIG. 2) in which the valve member is sealingly engageable with valve seat 27 thereby to block the flow of refrigerant through flow passage F and an open position (not shown) in which the valve member is raised in axial direction clear of valve seat 27 thereby to permit the flow of refrigerant through flow passage F. The valve member is axially shiftable through a stroke S, as shown in FIG. 2, as it is moved between its closed and open positions. Preferably, this stroke is limited to be a short distance, for example 0.020 inches (0.5 mm.) thereby to limit valve member velocity upon actuation and to limit impact of forces as the valve opens and closes.

On the lower end of valve member 35, an elastomeric seal 39 is provided which, when valve member 35 is in its closed position, sealably engages valve seat 27 thereby to sealably close flow passage F. Of course, when valve member 35 is in its open position, seal 39 is clear of the valve seat and permits the flow of refrigerant through flow passage F.

In accordance with this invention, it will be noted that the cross-sectional bearing area of valve seat 27 is relatively large so that when elastomeric seal 39 sealably engages the valve seat, substantial indentation of the elastomeric valve member material is prevented, and yet the valve member is readily sealed on the valve seat. Additionally, the provision of the elastomeric valve member lessens impact loads of the valve member as it moves toward its closed position and as it engages the valve seat.

Solenoid actuator 33 further comprises an axial tube 41 which has a solenoid core 43 disposed therein and fixedly held in place within tube 41. This core is preferably made of a suitable ferromagnetic material. The lower end of tube 41 is flared outwardly, as indicated at 44, and this flared end is sealably secured (e.g. welded) to valve body 19 thereby to seal the tube relative to the valve body and to prevent leakage of refrigerant.

A conical coil compression spring 47 is interposed between movable valve member 35 and core 43 thereby to resiliently bias valve member 35 away from core 43 toward its closed position in engagement with valve seat 27. As is shown, spring 47 is disposed in a blind hole 49 in the upper end of the valve member and the upper end of the spring is received in a corresponding blind counterbore 51 provided in the bottom face of core 43. It will be understood that the diameter of hole 49 and of counterbore 51 in valve member 35 and in core 43 are somewhat larger than the maximum diameter of spring 47 thereby to permit compression of the spring without binding of the spring on the walls of the blind hole or counterbore. Preferably, compression coil spring 47 is a conical coil spring having its smallest diameter at its top in engagement with core 43 and thus constitutes a so-called increasing spring rate spring in which the spring constant of the spring increases with increased deflection of the spring. Thus, the spring is compressed its maximum amount and exerts a maximum biasing force on valve member when valve member 35 is fully withdrawn into the bore of the solenoid. A solenoid coil 53 (shown in phantom) surrounds tube 41. This solenoid coil is enclosed by a sheet metal cover 55. It will be understood that suitable electrical lead wires (not shown) for the coil extend from housing 55 thereby enabling the coil to be selectively energized and de-energized.

Figure 7:
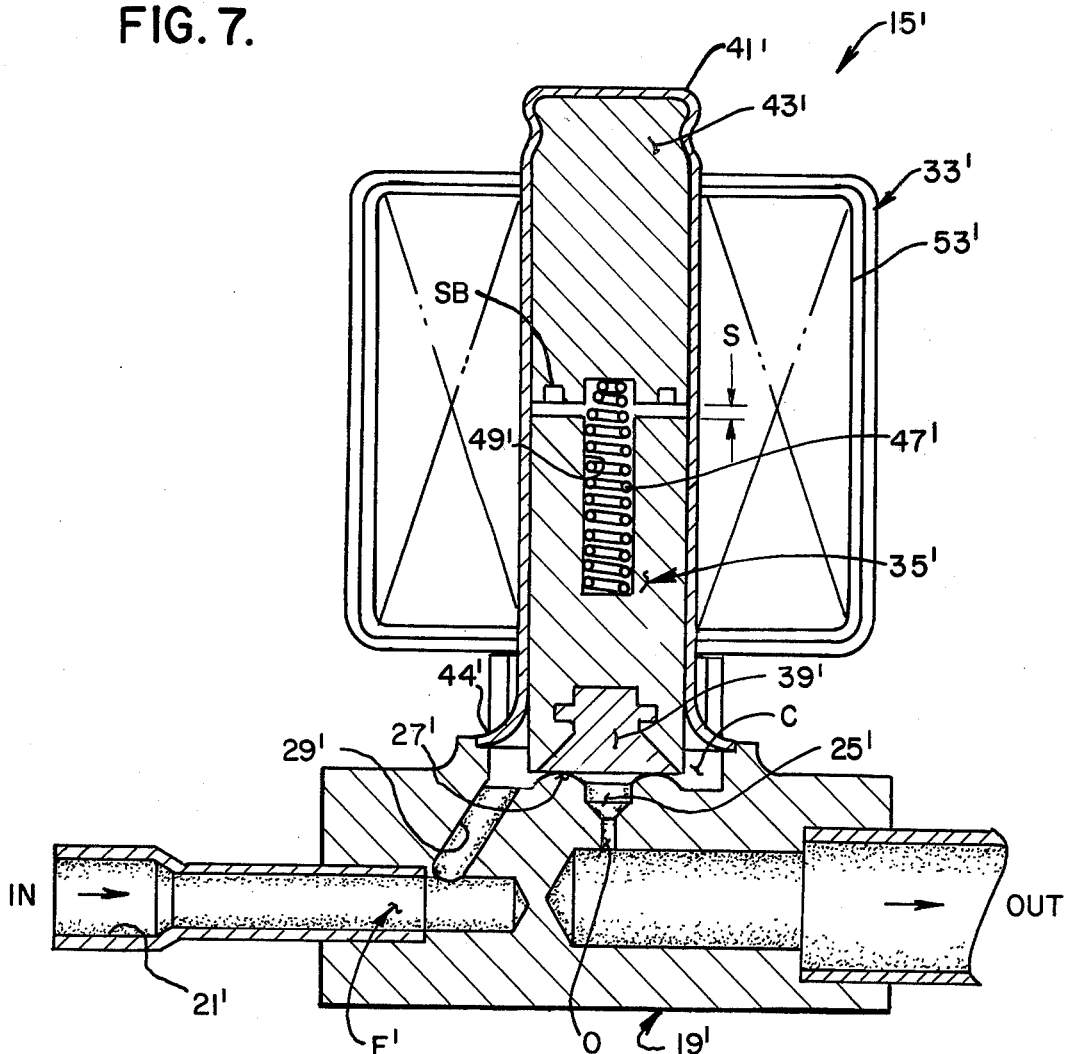
FIG. 7 is a view similar to FIG. 2 of another embodiment of a solenoid control valve of the present invention.

Referring now to FIG. 7, another embodiment of the solenoid operated expansion device or valve of this invention is indicated in its entirety by reference character 15'. As can be seen by comparing valves 15 and 15' as respectively illustrated in FIGS. 2 and 7, this second embodiment of the solenoid valve is, in many respects, highly similar or identical in construction and in operation to valve 15 heretofore described. For the sake of brevity, it will be understood that the "primed" reference characters used in FIG. 7 indicate parts corresponding in construction and operation to similar parts heretofore described in regard to valve 15.

A primary difference between valve 15 and valve 15' is the arrangement of passage 29' leading from inlet 21' and in expansion port 25'. Referring to valve 15, as illustrated in FIG. 2, it will be noted that passage 29 extends generally perpendicularly to inlet flow passage F and is in communication with the bottom face of elastomeric seal 39 carried by valve member 35. Thus, the pressure forces of the refrigerant entering flow passage F through valve 15 acts directly against bottom of the valve member and tend to act against the biasing force of spring 47 which holds the valve closed. Further, upon energization of solenoid coil 53, the valve member 35 moves axially away from valve seat 27 thereby to permit refrigerant to flow from passage 29 to oblique passage 31 from whence it flows into outlet fitting 23. Because the cross sectional area of the valve opening is directly determined by the distance the valve member moves axially in response to energization of the solenoid, the flow rate of refrigerant through the valve is also dependent on the length of the stroke of the valve member.

Referring to FIG. 7, it will be seen that the inlet passage 29' leading from the inlet fitting 21' is an oblique passage and is in communication with a chamber C surrounding the lower end of valve member 35'. It will be understood that the refrigerant is free to flow between sleeve 41' and valve member 35' so that refrigerant fills space S. Thus, the refrigerant pressure in chamber C does not counteract the closing force of spring 47' and thus the valve member 35' is positively maintained closed. Further, outlet passage 25' is generally concentric with valve seat 27' and further has a narrow orifice O therein constituting an expansion orifice for metering the flow of refrigerant into the outlet passage of the valve. It will be appreciated that upon energization of solenoid 53' of valve 15' and upon valve member 35' moving axially away from valve seat 27', the cross sectional area of the valve opening between the bottom face of elastomeric seat 39' and valve seat 27' will almost instantaneously be much larger than the cross sectional area of orifice O. Thus, as soon as valve member 35' moves from its closed position, refrigerant flowing through valve 15' will attain a maximum or choked flow condition through the metering orifice O regardless of the stroke S' of valve member 35'. Accordingly, it will be recognized that the provision of this orifice substantially reduces the sensitivity of the flow rate of refrigerant through valve 15' to the length of stroke S' of the valve. Additionally, a shading band SB is provided for improving magnetic pull of valve member 35' and quietness of operation upon energization of solenoid coil 53' when the latter is energized by AC power from control system 57.

In accordance with this invention, as indicated generally at 57, means is provided responsive to one or more refrigerant system parameters for controlling operation of the on/off solenoid expansion valve 15 or 15' for regulating the flow of refrigerant through the refrigeration system 1. More specifically, control means 57 includes a power supply for periodically (repeatedly) energizing and de-energizing valve 15 with the ratio of the energization (open) time of the valve relative to the de-energization (closed) time of the valve being responsive to the refrigeration parameter being monitored thereby to regulate the flow of refrigerant through the refrigeration system so as to maintain the temperature of the refrigerant exiting evaporator 13 (or flowing through suction line 15) to be within a predetermined superheat range.

Control means 57 operates continuously comparing the refrigeration system parameter being monitored against a known value. Upon detecting an error between the monitored parameter and the reference or known value, the output voltage signals supplied to solenoid valve 15 is correspondingly varied thereby to eliminate the error between the system reference and the parameter being monitored. While many system parameters, such as ambient air temperature or the temperature of the lubricant of the sump of the compressor 3, may be monitored, a preferred system parameter is the superheat temperature of the suction gas discharged from the evaporator in suction line 17.

Figure 3:
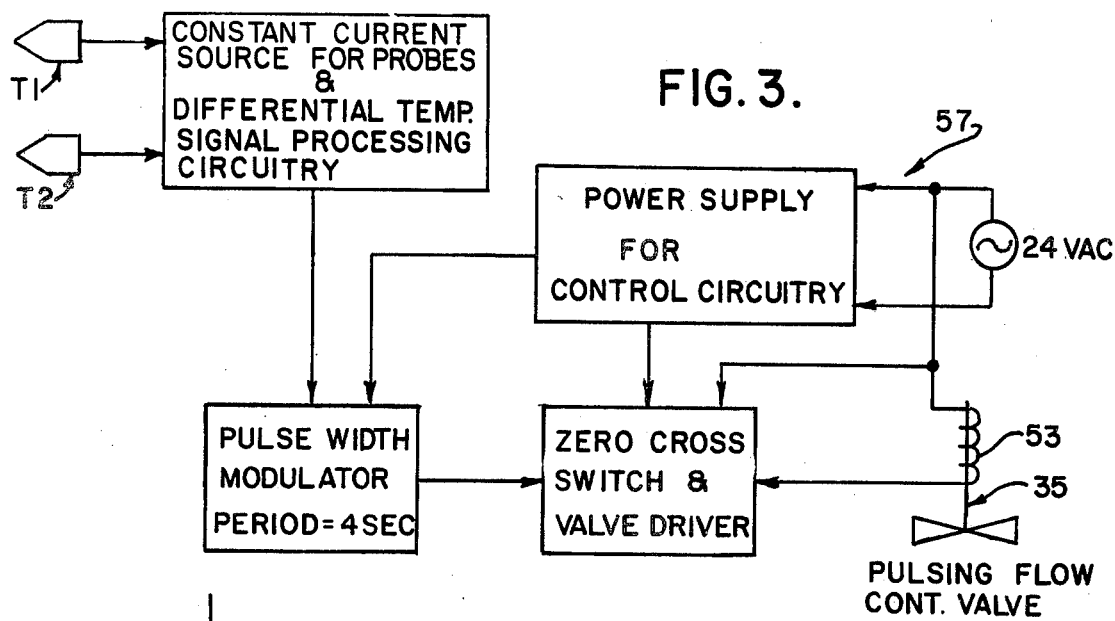
FIG. 3 is a block diagram of the control system for controlling operation of the solenoid valve illustrated in FIG. 2.
Figure 6:
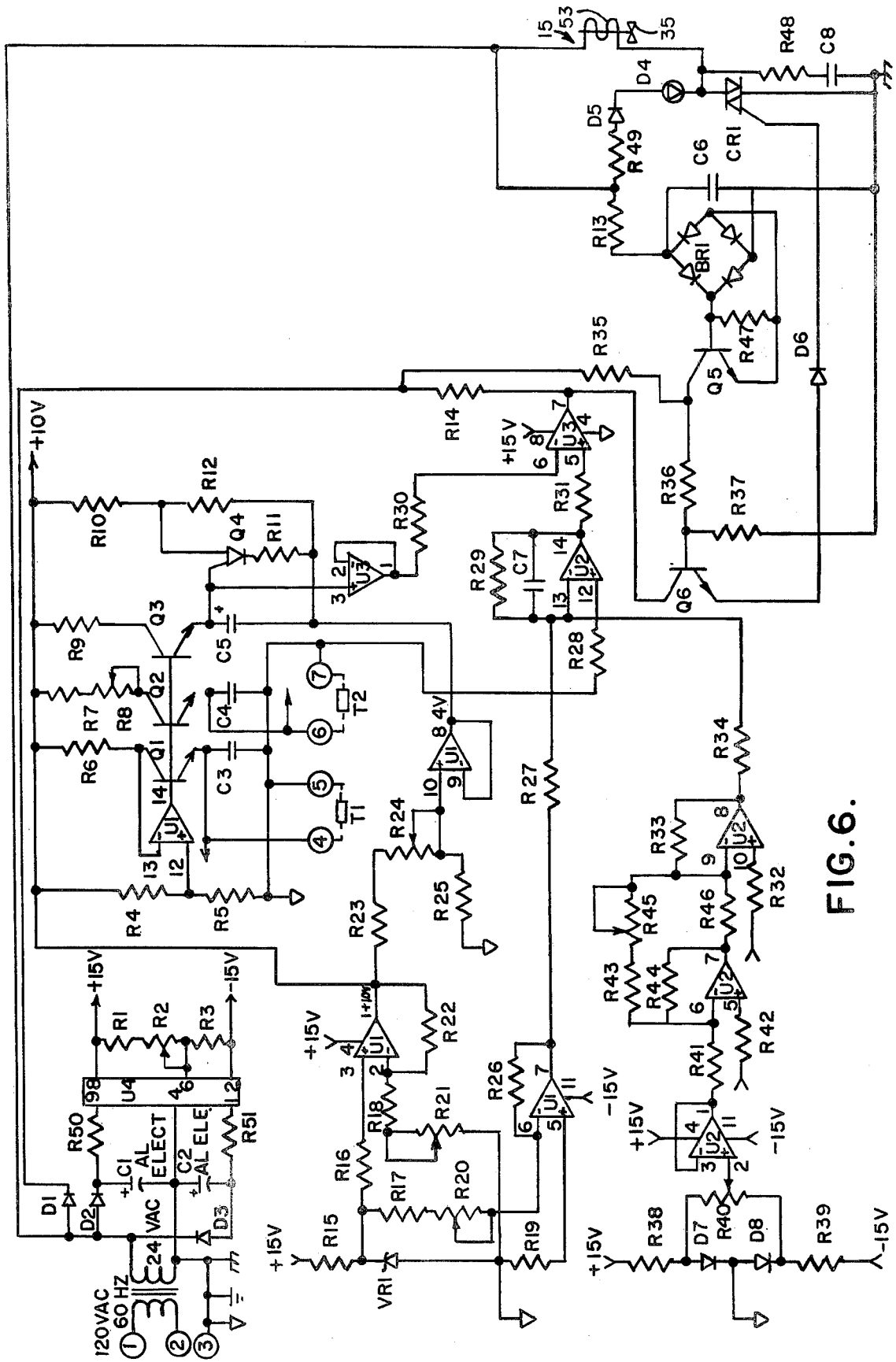
FIG. 6 is an electrical schematic of a control system of the present invention.

Referring to FIG. 3, a block diagram of the principal functional aspects of a presently preferred control system 57 of the present invention is shown. In FIG. 6, the circuitry for carrying out this block diagram is presented. The values for the components of the circuitry of FIG. 6 are disclosed in the following tables.

| Component Number | |
|---|---|
| Resistors | |
| | Resistance (Ohms) |
| R1, R25 | 4.02K |
| R3 | 4.22K |
| R4 | 2.21K |
| R5, R19 | 8.25K |

| -continued | |
|---|---|
| Component Number | |
| R6, R18 | 1.96K |
| R7 | 1.62K |
| R9 | 330K |
| R10 | 100K |
| R11 | 43 |
| R12 | 164.8K |
| R22, R23 | 6.19K |
| R15, R44, R46 | 2.49K |
| R16 | 1.5K |
| R17 | 10K |
| R26 | 24.9K |
| R27, R29 | 49.9K |
| R28 | 16.4K |
| R30, R31, R32, R42 | 1K |
| R33, R34 | 11K |
| R38, R39 | 3.16K |
| R41 | 280K |
| R43 | 123K |
| R13 | 2.2K |
| R14 | 6.02K |
| R35, R37 | 10K |
| R36 | 3.3K |
| R47 | 100K |
| R48 | 100 |
| R49 | 1.5K |
| R2, R8, R21 (trimpot) | 500 |
| R20, R24, R40 (trimpot) | 1K |
| R45 (trimpot) | 500 |
| R50 | 430 |
| R51 | 560 |

| Capacitors | |
|---|---|
| | Capacitance (micro-farads) |
| C1, C2 | 330 |
| C3, C4 | .01 |
| C7 | .33 |
| C6, C8 | .1 |
| C5 | 10 |

| Diodes | |
|---|---|
| | Designation |
| D1, D2, D3, D5, D6, D9 | IN 4001 |
| D7, D8 | IN 4149 |
| D4 (LED) | MV 5055 |

| Transistors | |
|---|---|
| | Designation |
| Q1, Q2, Q3, Q5, Q6 | NPN 2N3904 |

| Operational Amplifiers | |
|---|---|
| | Designation |
| U1, U2 | CA 324 |
| U3 | CA 358 |
| U4 | NE 5553U |

| Miscellaneous Components | | |
|---|---|---|
| | Description | Designation |
| VR1 | Voltage Reference | LM 336 |
| BR1 | Bridge | VM 08 |
| CR1 | Triac | T2322A |

From the above description and from the diagrams and schematics presented in FIGS. 3 and 6, one skilled in the art could construct and operate control means 57 and thus a detailed description of the construction and operation of the control system has been eliminated as being unnecessary.

Figure 5:
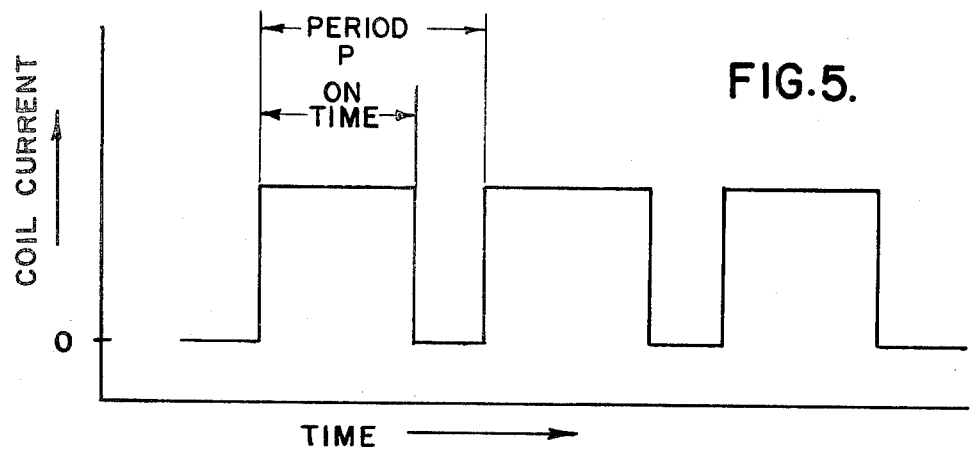
FIG. 5 is a plot of coil current energizing the solenoid actuator of the solenoid valve versus time.

As heretofore mentioned, valve 15 or valve 15' is periodically energized and de-energized. As used herein, the term "periodically" is defined to mean the control means 57 operates continuously (at least while compressor 3 is in operation), but that it operates in a series of continuous periods P of uniform or constant time, as shown in FIG. 5. Each period P is of a length of time which is considerably shorter than the normal time response (or time constant) of the evaporator. For example, assume that the parameter being controlled is superheat. When the valve opens superheat begins to drop. The time response of a typical evaporator is such that if the valve stayed fully open, about 20 seconds would be required for a significant drop in superheat to take place. Since the valve is typically open for less than 4 seconds, the effect is a relatively smooth control of superheat. The thermal mass and other characteristics of the evaporator are such that the evaporator does not respond fast enough for the controlled parameter to follow each pulse of the valve.

Control means 57 has a triggering circuit which automatically initiates the output of the A.C. current at the start of each period and which selectively terminates or breaks the current output at a point during each period P in response to the refrigeration system parameter being monitored and the error signals generated upon comparing the desired system parameter to the selected reference. Specifically, control means 57 varies the ratio of energization time of solenoid valve 15 to the de-energization time of the valve during each period P in response to the above-noted error signal. It will be appreciated that if the error signal is zero (or some other preselected value), the voltage output signal supplied to the solenoid valve is terminated at time zero during each period P and the solenoid valve is not energized at all. Thus, valve 15 remains closed and blocks the flow of all refrigerant through the refrigeration system. If the error signal is at or exceeds another preselected value, the voltage output signal remains on during the entire period P and thus the solenoid valve continuously remains open and permits a maximum flow of refrigerant through refrigeration system 1. It will be appreciated that by proportionally varying the energization time to the de-energization time during each period P between the upper and lower error signal limits, as above described, the discrete on/off solenoid 15 functions as an infinitely variable modulating refrigerant control valve.

Figure 4:
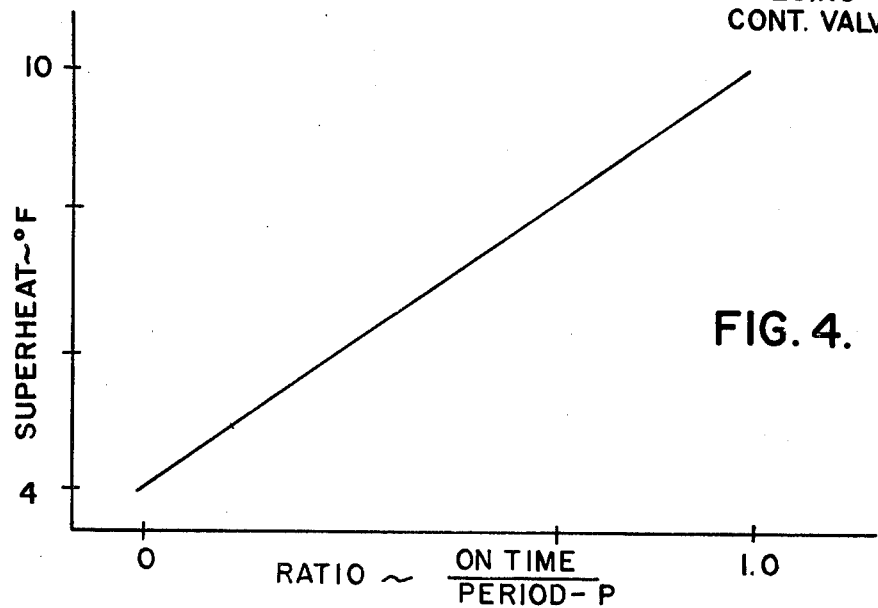
FIG. 4 is a plot of superheat temperature of the refrigerant versus the ratio of energization time to de-energization time during each period of operation of the solenoid valve.

In an application in which the superheat of the refrigerant in suction line 17 is used as the system parameter and in which the superheat is desired to be maintained at a predetermined level (e.g., 8° F.), it is seen in FIG. 4 that the ratio of on time or energization time for solenoid operated valve 15 equals about 0.7 such that the desired superheat of the refrigerant is maintained. In FIG. 5, it is shown that the ratio of on (or energization) time of valve 15 in relation to the entire period is also about 0.7. If, for example, the period P is about 4 seconds, the on (or energization) time for solenoid valve 15 will amount to approximately 2.8 seconds and the off (or de-energization) time for the valve will amount to about 1.2 seconds.

If the superheat sensed by control means 57 is above the pre-selected value for the superheat (e.g. 8°), control means 57 will increase the on time of the valve. If, on the other hand, the superheat sensed is too low, the control means correspondingly reduces the on time thereby to bring the superheat to the desired, predetermined level.

As noted above, the period P is relatively small in regard to the time constants or time response of refrigeration system 1. Thus, control system 57, in effect, integrates the on-off steps of solenoid valve 15 into an essentially steady state operating condition. For example, if the ratio of on time to the period equals 0.5, this would correspond to the valve being throttled to an intermediate position between its closed and full open position so as to permit the flow of about one-half of the flow rate of refrigerant as when in its full open condition. Of course, if the ratio of on time to period P is zero, the valve is closed and the flow of all refrigerant therethrough is blocked, and if the ratio is 1, the valve stays open for the entire period and thus the maximum flow rate of refrigerant is free to flow through the valve.

The circuitry for control means 57 is schematically depicted in FIG. 6. It will be understood that the circuitry depicted in FIG. 6 constitutes only one control circuit for operating the on/off solenoid valve 15 in accordance with this invention and that any number of suitable control circuits may be utilized. The above-described control system varies the ratio of the valve open time to the total period P proportionally to the monitored refrigeration system parameter (e.g., temperature differential between evaporator inlet and outlet). In a second type of optional controller, a sample and hold technique, or integrating control, may be employed. In this second controller, the control parameter is sampled on an instantaneous basis and a finite step change in the ratio of on time to the period P is made on the basis of a predetermined program relationship between the instantaneous value of the controlled parameter and the step change in the on time/period ratio. In other words, the direction (i.e., positive or negative) of the step change in the on time/period ratio is a function of the value of the controlled parameter.

Figure 8:
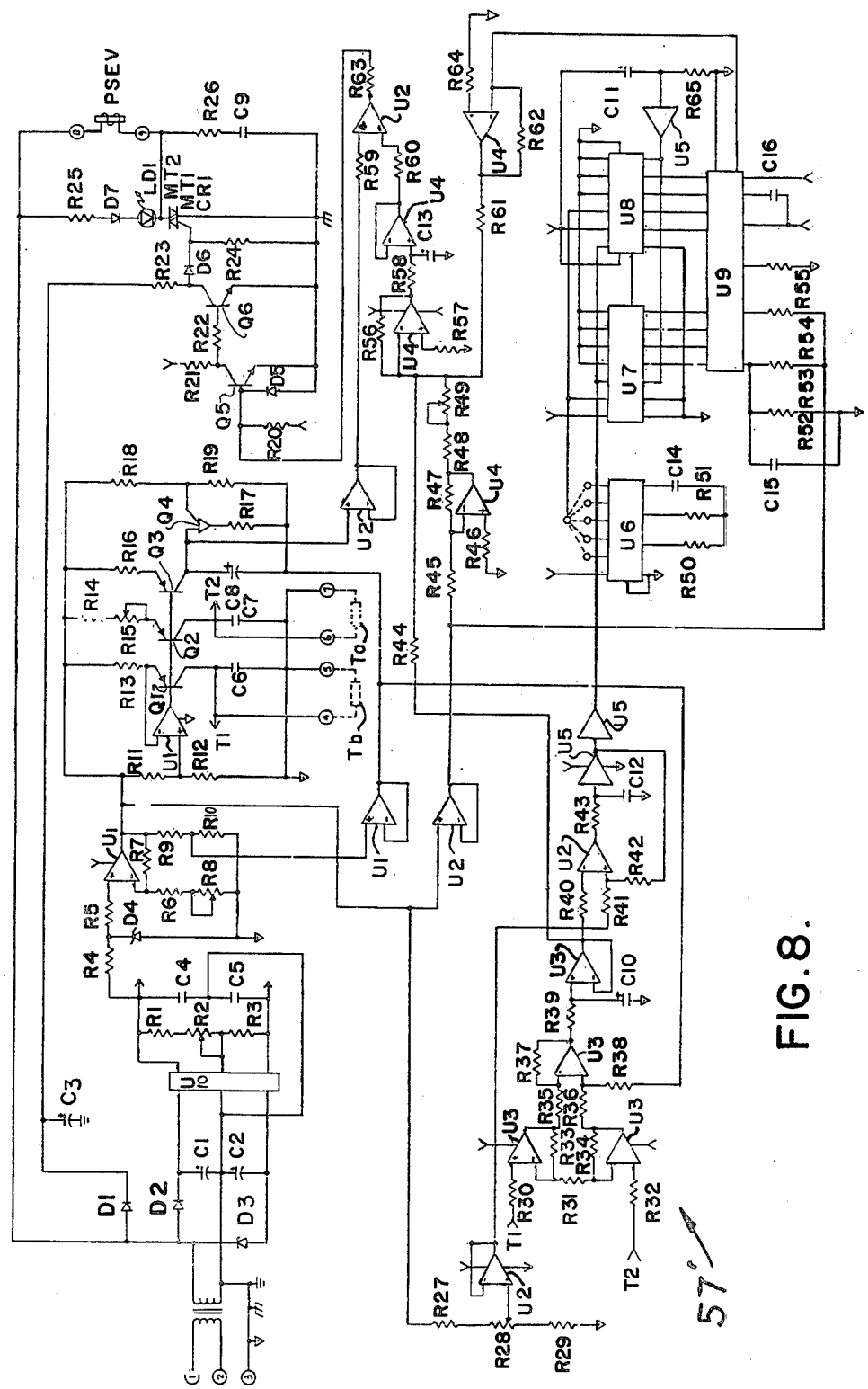
FIG. 8 is an electrical schematic of a proportional and integrating control system of the present invention.

Referring now to FIG. 8, still another control means, as indicated generally by reference character 57', is provided in which a proportional output signal, of the type generated by control means 57, is combined with a so-called integrating control system. Thus, control system 57' may be referred to as a proportional and integrating-type control system. Oftentimes, an integrating type control system is referred to as a reset automatic control system. In the operation of a proportional control system, as shown in FIG. 6, such a system is comparatively simple to design and manufacture, but such proportional control systems are not well-suited when the error signal generated by the controlled parameter (e.g., superheat) must be reduced to or near zero since the controlled element (e.g., expansion device 15) is driven only in response to the error signal. In a proportional control system, some degree of error from the set point is normally required so as to control operation of the device. Of course, small errors can be achieved by making the gain of the control system high, but this usually results in control system instability and in erratic operation of the control system.

On the other hand, an integrating control system operates by making regular adjustments to the controlled elements as long as any error (i.e., deviation from the set point) exists in the controlled parameter (e.g., superheat). For example, in the refrigeration system described herein, superheat (i.e., refrigerant temperature differential between expansion coil inlet, $T_a$ and expansion coil outlet, $T_b$) is determined on a regular basis at equal time intervals. If the error signal detected is positive, (i.e., if the differential temperature is above the set point thus indicating an inadequate refrigerant feed), the period of expansion valve 15 would be increased by small increment, (perhaps 1% of the total period P). After the next interval time, the control parameter is again sampled and if the error is still positive, the period of the valve is further increased, for example, an additional 1%. Conversely, if a negative error signal is detected, the length of the period during which valve 15 remained open is decreased by a predetermined amount (e.g., 1%) and this process would be continued so long as a negative error signal persisted. However, integrating control systems are sometimes slow in response to sudden system transients. The optional controller of this invention, as generally indicated at 57', and as is shown in detail in FIG. 8, is a combination of proportional and integrating control techniques. In this way, the fast transient response of a proportional control system is combined with the ability of an integrating control system to reduce the error of the controlled parameter (superheat) to zero. In control system 57', the opening of valve 15 or 15' (i.e., the length of on time of the period P) is the sum of a proportional contribution or signal plus the contribution from an integration type signal.

Referring to FIG. 8, the inputs to control system 57' consists of two temperature sensors $T_a$ and $T_b$ which are respectively the temperatures of the refrigerant at the inlet and outlet of a respective evaporator E. A third parameter, for example, $T_s$, referred to as the set point, is the ideal or desired value of the temperature of the refrigerant exiting the evaporator less the temperature of the refrigerant entering the evaporator (i.e., $T_b - T_a$). Control system 57' further includes a fourth parameter, referred to as an integrator count I, which is numerically equal to a value of valve 15 or 15' opening (i.e., the ratio of open time to total time of period P) expressed as a percentage. Upon initial electrical energization of control system 57', the integrator count I is at some value thereby to assure that the valve 15' is initially open at least a small amount. An initial value of the ratio of open time to total time of period P 20% would be typical for the integrator count I. A value of 4° F. will be assumed for the third parameter $T_s$ (i.e., the superheat set point).

The value of integrator I will be changed by controller 57' in accordance with the following relations. In a first case, if $T_b - T_a$ is less than 4° F., the value of the set point $T_s$, then the control system subtracts an increment (e.g., 1%) from the integrator value I at each time interval, t. In a second case, if $T_b - T_a$ is greater than the chosen set point $T_s$ (e.g., 4° F.), the control system 57' adds an increment (e.g., 1%) to the integrator value I at each time interval t. In a refrigerant feed control application, a time interval for the value t would typically be about 1 minute. The proportional contribution to valve opening (i.e., the ratio of open or energized time of valve 15 to the total time of period P) is equal to $([T_b - T_a] - T_s) \times G$ where G is the gain factor of the proportional amplifier portion of the control system 57'. When the temperatures in the above equation are expressed in degrees Fahrenheit and the valve opening is expressed as a percentage of its full open capacity, the numerical value of the gain G is about 3 for optimum control of a refrigeration system. When the proportional and integration components of system 57' are combined, the valve position, expressed in percentage as a ratio of open or energized time to the total length of period P, is given by the following expression: open time $\% = I + ([T_b - T_a] - T_s) \times G$.

Figure 9:
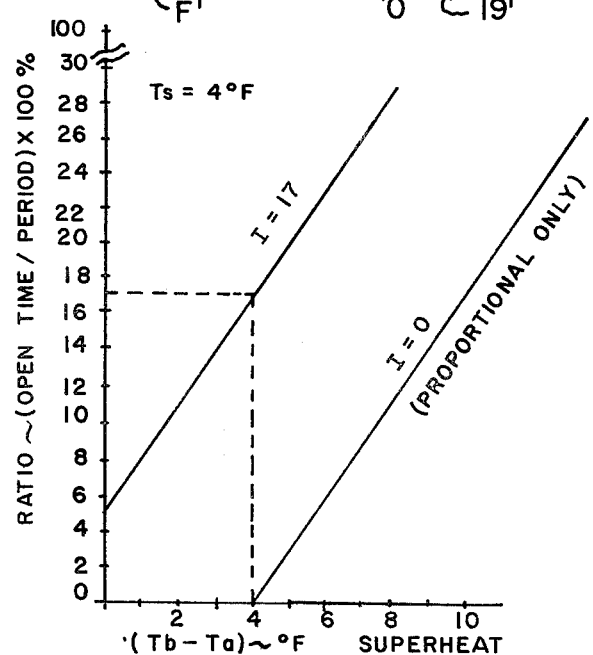
FIG. 9 is a plot of the ratio of the open time to the period P of a solenoid expansion valve as a function of a monitored parameter, such as superheat, with the solenoid valve controlled by a proportional and integrating control system, as illustrated in FIG. 8.

For example, referring to FIG. 9, it can be seen that when the system is operated such that the actual superheat is about 4° F., $(T_b - T_a) - T_s = 0$. Thus, the signal supplied by the proportional portion of the system is zero, but the percentage of open time to period P of valve 15 remains about 17%. This represents the integration portion of the control system and maintains the 4° F. superheat setpoint. So long as the actual superheat remains about 4° F., the integrator will not be operable and the value of I remains constant at 17%. However, if $(T_b - T_a) - T_s$ becomes greater than zero, the integration portion of the control system begins to add an increment to the ratio of valve open time to period P and the proportional control becomes active thereby to increase the flow of refrigerant through the evaporator and to reduce the superheat. Thus, the control system has the stability of integration controllers plus the fast response time of proportional controllers.

The schematic for control system 57' is illustrated in detail in FIG. 8 and the following bill of materials will enable those skilled in the art to make and use the control system 57'.

| Component Number | |
|---|---|
| Resistors | |
| | Resistance |
| R1' | 4.02K |
| R3' | 4.22K |
| R5',R14',R66',R67' | 1.5K |
| R6', R58' | 1.96K |
| R7' | 6.19K |
| R9',R10',R23' | 10.0K |
| R11' | 1.62K |
| R12' | 8.25K |
| R13' | 1.58K |
| R16',R70' | 348.0K |
| R17' | 43 |
| R18',R19',R20',R47',R52',R62' | 100.0K |
| R21' | 9.1K |
| R22' | 3.33K |
| R24',R72' | 6.48K |
| R25' | 1.5K |
| R26' | 620 |
| R27',R31',R71',R73',R74' | 4.99K |
| R29',R43' | 9.09K |
| R30' | 1.78K |
| R32',R33' | 1.1K |
| R34',R49',R50',R53',R55',R57',R63' | 2.05K |
| R35',R36' | 215K |
| R37',R38' | 4.42K |
| R39',R40' | 8.87K |
| R41',R42' | 1K |
| R44',R45' | 2.49K |
| R46',R51' | 619K |
| R48' | 110.0K |
| R54' | 20.0K |
| R56' | 1.02K |
| R61' | 576 |
| R64',R65' | 2.05K |
| R68' | 3.48K |
| R69' | 649.0K |
| R4',R8',R15' (Trimpot) | 500 |
| R28' (Trimpot) | 5K |
| R60' (Trimpot) | 1K |
| Capacitors | |
| | Capacitance (micro-farads) |
| C1,C2' | 330 |
| C3' | 100 |
| C4',C5' | .22 |
| C6',C7',C16' | .1 |
| C8' | 10 |
| C9' | .68 |
| C10',C11',C12',C14' | 1 |
| C13' | 3.3 |
| C15' | .047 |
| C17' | 1 |
| Operational Amplifiers | |
| Designation | Description |
| U1',U2',U3',U4 | ICCA324 Quad. Op. Amp. |
| U5' | ICCA 358 Dual Op. Amp. |

-continued

Component Number

Miscellaneous Components

| Designation | Description |
|---|---|
| U6' | IC CD4060 | CMOS Counter |
| U7',U8' | IC DC4516 | Binary U/D Counter |
| U9' | DC DAC08 | D/A |
| U10' | IC CD4050 | CMOS Hex Buffer |
| U11' | NE 5554 | F15VDC Regulator |
| Q1',Q2',Q3' | 2N3906 | PNP transistor |
| Q4' | 2N6028 | PUT Prog. Unijunction trans. |
| Q5',Q6' | 2N3904 | NPN transistor |
| D1',D2',D3',D5',D6',D7' | 1N4001 | Rectifier Diode |
| D4' | UM336 | 2.5V Ref |
| LD1' | RED,LED | |

Valves 15 or 15', the detailed construction of which have heretofore been described, are particularly well-suited for use as an on/off, continuously variable flow valve utilized in accordance with the control system and method of this invention because they have a long service life, even when repeatedly cycled to open and close in the manner heretofore described. Because of the special features of the valve in lessening opening and closing shock of the movable valve member 35 and because of the relatively large contact area of elastomeric valve member 39 on valve seat 27, the valve has a long service life and little or no maintenance is required.

The method of the present invention of controlling an expansion valve for a refrigeration system utilizes an on/off solenoid valve 15, such as heretofore described, and a control system 57, such as described above. Briefly, the method of this invention comprises monitoring a parameter of the refrigeration system, such as the superheat of the suction gas being returned to the inlet of compressor 3, or the temperature differential between inlet and outlet of evaporator coil. This temperature differential is often considered to be an acceptable approximation of true superheat, particularly on refrigeration coils having a low pressure drop. The control system is then utilized to generate a signal in response to this refrigeration system parameter and this signal is utilized to effect repeated periodic energization and de-energization of the solenoid valve with the ratio of energization time to the length of the period of each energization cycle responsive to the signal so as to regulate the flow of refrigerant through the refrigeration system.

Alternatively, another method of controlling the on/off solenoid valve 15 or 15' utilizing a control system 57' includes utilizing the integration portion of the control system to maintain the superheat of the refrigerant at a predetermined set point, $T_s$, for example 4 F. In response to an increased load on the evaporator, the superheat of the refrigerant $(T_b - T_a)$ will increase thus making the quantity $(T_b - T_a) - T_s$ greater than zero. This, in turn, causes the proportional portion of the control system 57' to be added to the integration portion of the control system thus increasing the ratio of on time/period P and causing an increase in the flow of refrigerant. In the event the actual superheat $(T_b - T_a)$ becomes less than zero, the proportional portion of the control system 57' will remain passive, but an increment will be removed from the integrator value I thus reducing the ratio of open time to period P and thus reducing the flow of refrigerant.

It will be understood that in some applications, it may be an advantage to have a valve which is open when the solenoid is de-energized, and closed when the solenoid is energized.

In view of the above, it will be seen that other objects of this invention are achieved and other advantageous results obtained.

As various changes could be made in the above constructions or methods without departing from the scope of the invention, it is intended that all matter contained in the above description or shown in the accompanying drawings shall be interpreted as illustrative and not in a limiting sense.

I claim:

1. Apparatus for controlling a refrigeration system, the latter comprising a compressor having an inlet and an outlet, a condenser connected to the outlet of the compressor, an evaporator connected to said condenser and to the inlet of said compressor, an expansion valve between said condenser and said evaparator, said condenser delivering high pressure liquid refrigerant to said expansion valve, said apparatus comprising a solenoid valve constituting said expansion valve, said solenoid valve having a valve body with a flow passage therewithin for the flow of refrigerant therethrough, a valve seat constituting a portion of said flow passage, a valve member selectively movable between a closed position in which it is sealingly engageable with said valve seat so as to block the flow of refrigerant through said flow passage and an open position in which said valve member is clear of said valve seat permitting the flow of refrigerant through said flow passage, said flow passage downstream from said valve seat having a metering orifice therein for restricting the flow of refrigerant through said flow passage to a predetermined flow rate when said valve member is open substantially independently of the distance said valve member is moved from its closed position, a solenoid actuator for effecting movement of said valve member between its closed and its open position upon energization and de-energization of said solenoid actuator, a spring for resiliently biasing said valve member toward one of its said positions, and control means for periodically energizing and de-energizing said solenoid actuator thereby to regulate the flow of refrigerant through said solenoid valve.

2. Apparatus as set forth in claim 1 wherein said control means includes means responsive to one or more operating parameters of said refrigeration system for varying the ratio of the energization time to the length of time of the period of said solenoid valve.

3. Apparatus as set forth in claim 2 wherein said control means includes means for sensing the superheat of the refrigerant discharged from said evaporator, means for generating a signal in response to the superheat of the refrigerant discharged from said evaporator, and means for comparing said signal to a predetermined value thereby to vary said energization time to period time ratio.

4. Apparatus as set forth in claim 2 wherein said evaporator has an inlet and an outlet, and wherein said control means includes means for sensing a temperature differential between said evaporator inlet and outlet, means for generating a signal in response to said temperature differential, and means for comparing said signal to a predetermined value thereby to vary said energization time to period time ratio.

5. Apparatus as set forth in claim 1 wherein said flow passage includes a chamber in communication with the outer surface of said valve member in sealing engagement with valve seat and a portion surrounded by said valve seat, the last-said portion of said flow passage having said metering orifice therewithin.

6. In a refrigeration system, said refrigeration system comprising a compressor having an inlet and an outlet, a condenser connected to the outlet of the compressor, an evaporator connected to said condenser and to the inlet of said compressor, an expansion valve between said condenser and said evaporator, said condenser delivering high pressure liquid refrigerant to said expansion valve, said refrigerant expanding as it flows through said expansion valve, wherein the improvement of this invention comprises: said expansion valve being a solenoid operated valve having a valve body with a flow passage therewithin for the flow of refrigerant therethrough, a valve seat constituting a portion of said flow passage, a valve member selectively movable between a closed position in which it is sealingly engageable with said valve seats so as to block the flow of refrigerant through said flow passage and an open position in which said valve member is clear of said valve seat permitting the flow of refrigerant through said flow passage, said flow passage downstream from said valve seat having a metering orifice therein for restricting the flow of refrigerant through said flow passage to a predetermined flow rate when said valve member is open substantially independently of the distance said valve member is moved from its closed position, a solenoid actuator for effecting movement of said valve member between its closed and its open position upon energization and de-energization of said solenoid actuator, a spring for resiliently biasing said valve member towards its closed position, and control means for periodically energizing and de-energizing said solenoid actuator with the ratio of energization time to the length of the period being responsive to one or more operating parameters of said refrigeration system thereby to regulate the flow of refrigerant through said expansion valve.

7. In a refrigeration system as set forth in claim 6 wherein said control means includes means for sensing the superheat of the refrigerant discharged from said evaporator, means responsive to said superheat for generating a signal in proportion to the superheat of the refrigerant discharged from said evaporator, and means for comparing said proportional signal to a predetermined value thereby to vary said energization time to period time ratio.

8. In a refrigeration system as set forth in claim 6 wherein said evaporator has an inlet and an outlet, and wherein said control means includes means for sensing a temperature differential between said evaporator inlet and outlet, means for generating a signal in response to said temperature differential, and means for comparing said signal to a predetermined value thereby to vary said energization time to period time ratio.

9. In a refrigeration system comprising a compressor having an inlet and an outlet, a condenser connected to the outlet of the compressor, an evaporator connected to said condenser and to the inlet of said compressor, an expansion valve between said condenser and said evaporator, said condenser delivering high pressure liquid refrigerant to said expansion valve, said refrigerant expanding as it flows through said expansion valve, wherein the improvement of this invention comprises: said expansion valve being a solenoid operated valve having a valve body with a flow passage therewithin for the flow of refrigerant therethrough, a valve seat constituting a portion of said flow passage, a valve member selectively movable between a closed position in which it is sealingly engageable with said valve seat so as to block the flow of refrigerant through said flow passage and an open position in which said valve member is clear of said valve seat permitting the flow of refrigerant through said flow passage, a solenoid actuator for effecting movement of said valve member between its closed and its open position upon energization and de-energization of said solenoid actuator, a spring for resiliently biasing said valve member towards its closed position, and control means for periodically energizing and de-energizing said solenoid actuator with the ratio of open time to the length of the period of said valve being responsive to one or more parameters of said refrigeration system thereby to regulate the flow of refrigerant through said expansion valve, said control means including means for sensing the superheat of the refrigerant discharged from said evaporator, means for generating a setpoint signal $T_2$ representative of a desired operating condition of the refrigeration system, said control means further including means for generating an integrator count signal corresponding to a predetermined ratio of valve open time to the length of the period which is greater than zero, said integrator count signal generating means further having means for comparing said superheat to said set point signal and if the difference between said superheat and said set point is less than zero, an increment will be subtracted from said predetermined ratio of energization time to the length of said period, and if the difference between said superheat and said set point is greater than zero, an increment will be added to said predetermined ratio of energization time to the length of said period.

10. In a refrigeration system as set forth in claim 9 wherein said control means includes means for generating a signal to increase the ratio of valve open time to the period proportional to the difference between the actual superheat of the system above said set point such that the percentage of open time of said valve to the period of the valve is the sum of integrator count signal and the proportional control signal.

11. Expansion apparatus for a refrigeration system, the latter comprising a compressor having an inlet and an outlet, a condenser connected to the outlet of said compressor, and an evaporator, said expansion apparatus comprising a solenoid operated valve and means for controlling operation of said solenoid valve thereby to regulate the flow of refrigerant through said evaporator, said solenoid valve having a flow passage for the refrigerant therethrough and a valve member movable between an open position in which refrigerant is free to flow through said evaporator and a closed position in which the flow of refrigerant is blocked, a solenoid for effecting movement of said valve member between its open and closed positions, said control means periodically energizing and de-energizing said solenoid with the ratio of open time of said valve to the length of time of the period being responsive to one or more parameters of the refrigeration system thereby to regulate the flow of refrigerant to the evaporator, wherein said control means includes means for sensing the superheat of the refrigerant discharged from said evaporator, means responsive to said superheat for generating a signal in proportion to the superheat of the refrigerant discharged from said evaporator, and means for comparing said proportional signal to a predetermined value thereby to vary said ratio of open time to said period, said control means further including means for generating a set point signal and means for generating an integrator count signal corresponding to a predetermined value of said ratio which is greater than zero, said integrator count signal generating means further having means for comparing said superheat to said set point signal and if the difference between said superheat and said set point is less than zero, an increment will be subtracted from said ratio, and if the difference between said superheat and said set point is greater than zero, an increment will be added to said ratio.

12. Expansion apparatus as set forth in claim 11 wherein said means for comparing said proportional signal and said predetermined value is inoperable so long as said predetermined value is greater than said proportional signal.

13. Expansion apparatus as set forth in claim 11 wherein the total percentage of the time said valve is open in relation to its period is the sum of the signal of the integration portion of the control system and the signal of the proportional control portion of the control system.

14. A method of controlling an expansion valve for a refrigeration system, said refrigeration system comprising a compressor having an inlet and an outlet, a condenser connected to the outlet of the compressor, an evaporator connected to said condenser and to the inlet of said compressor, an expansion valve between said condenser and said evaporator, said condenser delivering high pressure liquid refrigerant to said expansion value, said expansion valve being a solenoid valve selectively operable between an open and a closed position upon energization and de-energization of said solenoid valve, said valve being repeatedly energized and de-energized with the ratio of energization time to the length of the period being variable so as to regulate the flow of refrigerant through said valve, said method comprising the steps of:

monitoring a parameter of said refrigeration system;
generating a signal in response to said parameter;
generating a set point signal; and
generating an integrator count signal corresponding to a predetermined ratio of valve open time to the length of said period; and
comparing said parameter to said setpoint signal and if the difference between said proportional parameter signal and said setpoint is less than zero, subtracting an increment from said predetermined ratio, or if the difference between said parameter signal and said setpoint is greater than zero, adding an increment to said predetermined ratio.

15. The method of claim 14 wherein said step of monitoring a parameter comprises monitoring the superheat of the refrigerant.

16. The method of claim 14 said evaporator has an inlet and an outlet, and wherein said step of monitoring a parameter comprises monitoring the temperature differential between the inlet and outlet of said evaporator.

17. The method of claim 14 further comprising generating a proportional signal in response to said parameter, and comparing said proportional signal and said set point signal such that if the difference between said set point signal and said proportional signal is greater than zero, then the percentage of valve open time to said period is the sum of said integrated count signal and said proportional signal.

* * * * *